United States Patent
Xu et al.

(10) Patent No.: US 10,069,395 B2
(45) Date of Patent: Sep. 4, 2018

(54) VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 247 days.

(21) Appl. No.: 15/075,643

(22) Filed: Mar. 21, 2016

(65) Prior Publication Data

US 2017/0033664 A1 Feb. 2, 2017

(30) Foreign Application Priority Data

Jul. 30, 2015 (CN) ...................... 2015 2 0566068 U

(51) Int. Cl.
*H02K 33/16* (2006.01)
*H02K 33/18* (2006.01)

(52) U.S. Cl.
CPC ............. *H02K 33/18* (2013.01); *H02K 33/16* (2013.01)

(58) Field of Classification Search
CPC ........ H02K 33/12; H02K 33/14; H02K 33/16; H02K 35/02; H02K 1/34; B06B 1/045
USPC ................ 310/15, 21, 25, 28, 29, 17, 12.16; 381/396, 412, 420, 421
See application file for complete search history.

(56) References Cited

U.S. PATENT DOCUMENTS

| 5,546,069 A * | 8/1996 | Holden ..................... G08B 6/00 310/29 |
| 2004/0169425 A1* | 9/2004 | Aihara ..................... B06B 1/045 310/15 |
| 2007/0216235 A1* | 9/2007 | Lee ......................... H02K 33/16 310/36 |
| 2011/0018365 A1* | 1/2011 | Kim ........................ B06B 1/045 310/17 |

(Continued)

FOREIGN PATENT DOCUMENTS

| JP | 2002200460 A | * | 7/2002 |
| JP | 2010239851 A | * | 10/2010 |
| JP | 2014023238 A | * | 2/2014 |

OTHER PUBLICATIONS

Maruo, Machine Translation of JP2002200460, Jul. 2002.*
Shishida, Machine Translation of JP2010239851, Oct. 2010.*
Suzuki, Machine Translation of JP2014023238, Feb. 2014.*

*Primary Examiner* — Thomas Truong
*Assistant Examiner* — Eric Johnson
(74) *Attorney, Agent, or Firm* — Na Xu; IPro, PLLC

(57) ABSTRACT

A vibration motor, includes a fixed part having a housing with an accommodation space, and a coil fixed in the housing, the housing having an elongated direction; a vibration part comprising an elastic connector for suspending the vibration part in the accommodation space, a magnet assembly including a magnet and a weight for accommodating the magnet, the magnet having a magnetized surface. An extending direction of the magnetized surface is parallel to the elongated direction of the housing, and a vibration direction of the magnet assembly is vertical to the elongated direction of the housing.

7 Claims, 3 Drawing Sheets

(56) References Cited

U.S. PATENT DOCUMENTS

2013/0076178 A1* 3/2013 Kuroda .................. H02K 33/00
                                                                               310/81
2014/0202252 A1* 7/2014 Umehara .............. G01M 7/027
                                                                               73/664

\* cited by examiner

VIBRATION MOTOR

FIELD OF THE DISCLOSURE

The present disclosure generally relates to vibration motors, and more particularly to a vibration motor used in a portable consumer electronic device.

BACKGROUND

With the development of the electronic technologies, portable consumer electronic devices are more popular and desired by people. A portable consumer electronic device, such as a wireless communication device, generally includes a vibration motor sued for generating tactile feedback.

A vibration motor of relevant technology comprises a fixed part and a vibration part. The fixed part comprises a housing and a coil component arranged in the housing; the vibration part comprises a magnet assembly which is suspended in the housing by using an elastic connector. The magnet assembly comprises a magnet and a weight for accommodating the magnet, wherein the magnet has a magnetized surface. The housing is presented as a cuboid generally; the extending direction of the surface polarized is parallel to the length direction of the housing; therefore, the vibrating direction thereof is parallel with the length direction of the housing, that is, direction X. However, multiple magnets and multiple coils shall be arranged in the vibration motor in order along the direction of long axle to meet the need of performance when the dimensions of the housing are very great in the direction of long axle. Moreover, the utilization ratios of the magnetic field and the space are not high.

For this reason, it is necessary to provide a novel vibration motor to overcome the shortcomings above.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and an exemplary embodiment thereof.

Figure 1:
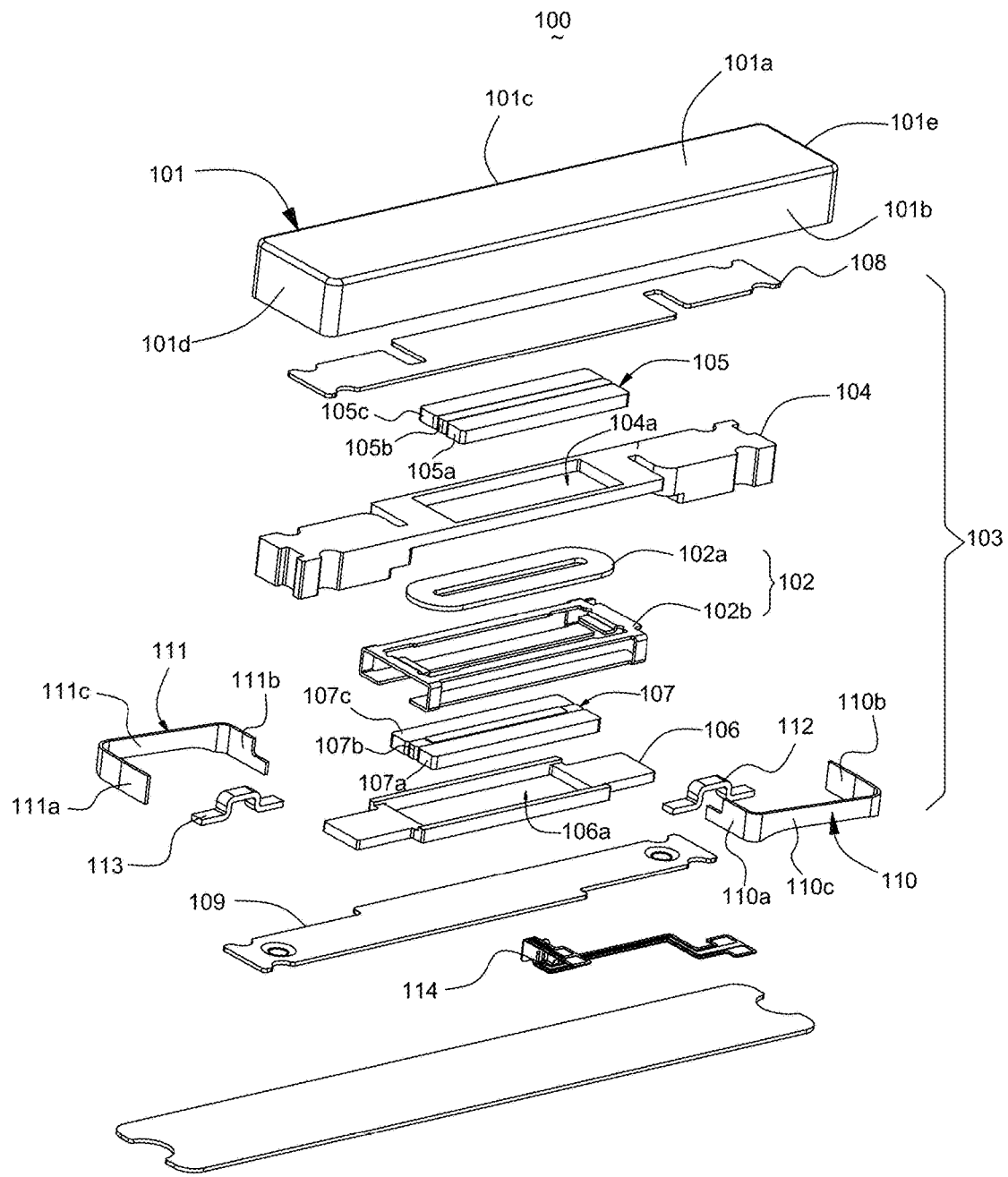
FIG. 1 is an exploded view of a vibration motor in accordance with an exemplary embodiment of the present disclosure.
Figure 2:
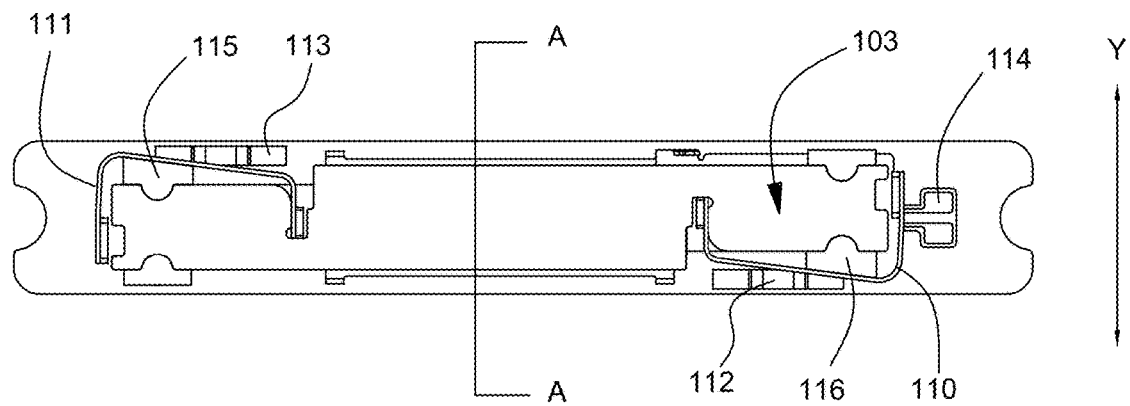
FIG. 2 is an illustration of the vibration motor in FIG. 1, wherein a housing thereof has been removed.
Figure 3:
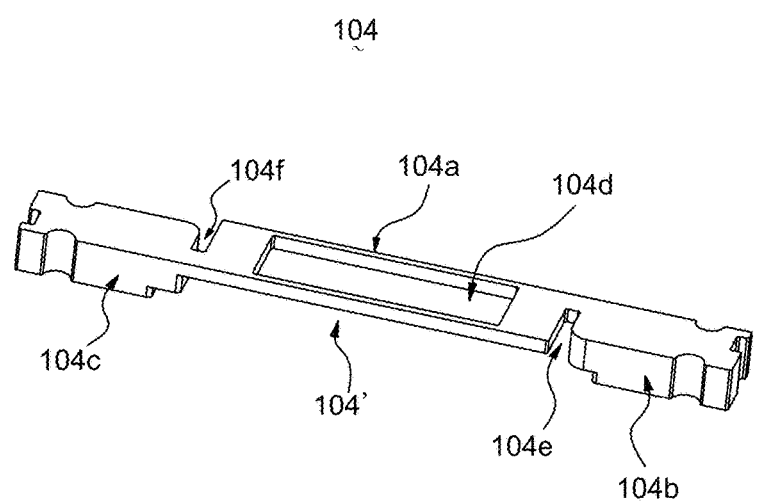
FIG. 3 is an isometric view of a first weight of the vibration motor in FIG. 1.

As shown in FIGS. 1-3, a vibrator motor 10 comprises a fixed part and a vibration part 103. The fixed part comprises a housing 101 having an accommodation space and a coil component 102 arranged in the housing 101 fixedly; the housing is presented as a rectangle integrally and comprises a bottom wall 101a, a front side wall 101b extending from the bottom wall 101a and arranged along the length direction, a rear side wall 101c opposite to the front side wall 101b, a left side wall 101d and a right side wall 101e connecting with the front side wall 101b and the rear side wall 101c and arranged opposite to each other. The vibration part 103 comprises a magnet and a weight for accommodating the magnet. The vibration motor 100 further comprises an elastic connector supporting the vibration part 103 in the accommodation space in suspending way.

The weight comprises a first weight 104 and a second weight connecting with the first weight 104 which has a main body part 104a, a first side wall 104b and a second side wall 104c arranged on two sides of the main body part 104a respectively and a groove 104' formed by the main body part 104a, the first side wall 104b and the second side wall 104c in a circle; a second mass 106 is hold between the first side wall 104a and the second side wall 104b and is separated from the main body part 104a with certain distance. The main body part 104a is provided with a first through hole 104d, and the second weight 106 is provided with a second through hole 106a; the magnet comprises a first magnet 105 accommodated in the first through hole 104d and a second magnet 107 accommodated in the second through hole 106a. Moreover, the vibration part further comprises a first pole core 108 connecting with the first weight 104 and a second pole core 109 connecting with the second weight 106.

As shown in FIG. 3, a first accommodation groove 104e is arranged between the first side wall 104b of the first weight 104 and the main body part 104a, and a second accommodation groove 104f is arranged between the second side wall 104c of the first weight 104 and the main body part 104a. Moreover, the opening of the first accommodation groove 104e faces a front side wall 101b, and the opening of the second accommodation groove 104f faces a rear side wall 101c.

The elastic connector comprises a first connector 110 and a second connector 111. The first connector 110 has a first right end 110b connecting with the right side wall 101e, a first left end 110a located in the first accommodation groove 104e and connecting with the first weight 104 and a first middle connection part 110c connecting the first right end 110b and the first left end 110a; while the second connector 111 has a second left end 111a connecting with the left side wall 101d, a second right end 111b located in the second accommodation groove 104f and connecting with the first weight 104 and a second middle connection part 111c connecting the second left end 111a and the second right end 111b. Moreover, the first connector 110 and the second connector 111 are presented as U-shape integrally.

The fixed part further comprises a coil component 102 arranged in the housing 101 fixedly, wherein the coil component 102 comprises a coil 102a and a support 102b for supporting the coil 102a. The support 102b is located between the first weight 104 and the second weight 106 partially in order to support the coil 102a between the first magnet 105 and the second magnet 107. Moreover, the first magnet 105 and the second magnet 107 are arranged on two sides of the coil 102a and opposite to the coil 102a; therefore, a closed loop is formed by the magnetic field formed by the first magnet 105 and the second magnet 107.

The first magnet 105 comprises a first front magnet 105a, a first middle magnet 105b and a first rear magnet 105c which are arranged in order along the vibration direction Y, and the direction of magnetic pole of the first front magnet 105a is opposite to that of the first rear magnet 105c; while the second magnet 107 comprises a second front magnet 107a, a second middle magnet 107b and a second rear magnet 107c which are arranged in order along the vibration direction Y, and the direction of magnetic pole of the second front magnet 107a is opposite to that of the second rear magnet 107c.

The directions of the magnetic poles of the first front magnet 105a and the second front magnet 107a are identical and are perpendicular to the coil 102; the directions of the magnetic poles of the first middle magnet 105b and the second middle magnet 107b are different and are parallel to the coil 102a; and the directions of the magnetic poles of the first rear magnet 105c and the second rear magnet 107c are identical and are perpendicular to the coil 102a.

Figure 4:
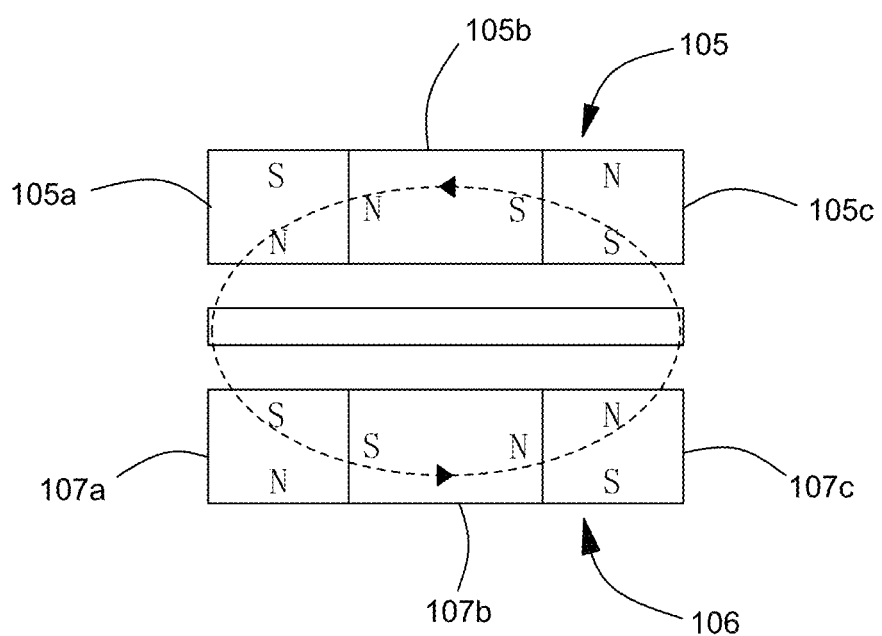
FIG. 4 is a cross-sectional view of a magnet assembly of the vibration motor taken along line A-A in FIG. 2.

Referring to FIG. 4, the magnetized direction of the magnetic pole of the first front magnet 105a, opposite to a coil 105a, involves poles S to N; the polar direction of the magnetic pole of the first rear magnet 105c, opposite to the coil 102a, involves poles N to S; and the polar direction of the magnetic pole of the first middle magnet 105b involves poles S to N. The polar direction of the magnetic pole of the second front magnet 107a, opposite to the coil 102a, involves poles N to S; the polar direction of the magnetic pole of the second rear magnet 107c, opposite to the coil 102a, involves poles S to N; and the polar direction of the magnetic pole of the second middle magnet 107b involves poles N to S. Therefore, the closed loop is formed by the magnetic field; and all magnets have magnetized surfaces whose extending directions are parallel with the length direction of the housing 101. Moreover, the "Extending Direction of Magnetized surface" in the present disclosure means extending direction of the surface polarized of each of magnets.

The first magnet 105 and the second magnet 107 shall be subjected to stress as a result of the magnetic field generated upon charging of the coil 102a by using a soft circuit board 114 when the vibration motor 100 works; the directions of the force of the first magnet 105 and the second magnet 107 shall also be changed as a result of changes of direction of the current along time, therefore the vibration part is driven to reciprocate along the length direction of the housing 101 in presence of supporting effect of the elastic connector. The vibration part 103 shall reciprocate along direction Y when subjected to the force from the magnetic field of direction Y in FIG. 2 according to the left-hand rule because the extending direction of the magnetized surface is parallel with the length direction of the housing 101. Moreover, the vibration motor of the utility model improves the utilization ratio of the magnetic field and the space by using one coil and several magnets only compared with the available vibration motor vibrating in direction X.

The vibration motor 100 further comprises a first damper 116 arranged between the first middle connection part 110c and the first weight 104, a second damper 115 arranged between the second middle connection part 111c and the first weight 104, a first stopper 112 arranged between the first middle connection part 110c and the front side wall 101b, a second stopper 113 arranged between the second middle connection part 111c and the rear side wall 101c and the soft circuit board 114 connecting with the coil 102a electrically.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, including:
a fixed part comprising a housing with an accommodation space, and a coil fixed in the housing, the housing having an elongated direction;
a vibration part comprising an elastic connector for suspending the vibration part in the accommodation space, a magnet assembly including a first magnet, a second magnet, a first weight and a second weight, the first weight for accommodating the first magnet, the second weight for accommodating the second magnet, each of the first magnet and the second magnet having a magnetized surface; wherein
an extending direction of the magnetized surfaces is parallel to the elongated direction of the housing, and a vibration direction of the magnet assembly is perpendicular to the elongated direction of the housing;
the second weight connected with the first weight, the first weight comprising a main body part provided with a first through hole in which the first magnet is arranged, a first side wall and a second side wall arranged on two sides of the main body part and a groove formed by the main body part, the housing comprising a bottom wall, a front side wall arranged in the elongated direction and extending from the bottom wall, a rear side wall opposite to the front side wall along the vibration direction, a left side wall and a right side wall connected with the front side wall and the rear side wall and arranged opposite to each other along the elongated direction;
a first accommodation groove arranged between the first side wall of the first weight and the main body part, and a second accommodation groove arranged between the second side wall of the first weight and the main body part; an opening of the first accommodation groove facing the front side wall, and an opening of the second accommodation groove facing the rear side wall;
the elastic connector comprising a first connector and a second connector the first connector having a first right end connected with the right side wall, a first left end located in the first accommodation groove and connected with the first weight and a first middle connection part connecting the first right end with the first left end and the second connector comprising a second left end connected with the left side wall, a second right end located in the second accommodation groove and connected with the first weight and a second middle connection part connecting the second left end with the second right end.

2. The vibration motor as described in claim 1, wherein the second weight is sandwiched between the first side wall and the second side wall and is separated from the main body part with a certain distance, the second weight has a second through hole in which the second magnet is fixed.

3. The vibration motor as described in claim 2, wherein the first magnet comprises a first front magnet, a first middle magnet and a first rear magnet which are arranged in order perpendicular to the elongated direction of the housing; the first front magnet has a magnetic pole direction opposite to that of the first rear magnet; the second magnet comprises a second front magnet, a second middle magnet and a second rear magnet which are arranged in order perpendicular to the elongated direction of the housing; the second front magnet has a magnetic pole direction opposite to that of the second rear magnet; the magnetic pole directions of the first front magnet and the second front magnet are identical and are perpendicular to the coil; the magnetic pole directions of the first middle magnet and the second middle magnet are different and are parallel to the coil; the magnetic pole directions of the first rear magnet and the second rear magnet are identical and are perpendicular to the coil.

4. The vibration motor as described in claim 2, wherein the fixed part further comprises a support including a part located between the first weight and the second weight for carrying the coil between the first magnet and the second magnet.

5. The vibration motor as described in claim 1, wherein the first connector and the second connector are U-shaped.

6. The vibration motor as described in claim 1, wherein the vibration motor further comprises a first damper arranged between the first middle connection part and the first weight and a second damper arranged between the second middle connection part and the first weight.

7. The vibration motor as described in claim 1 further comprising a first stopper arranged between the first middle connection part and the front side wall and a second stopper arranged between the second middle connection part and the rear side wall.

* * * * *